Aug. 29, 1967     W. L. WEST     3,337,889
MECHANICAL DEVICE FOR CLEANING THE
INTERIOR OF LARGE AQUARIUM TANKS
Filed March 11, 1966     4 Sheets-Sheet 1
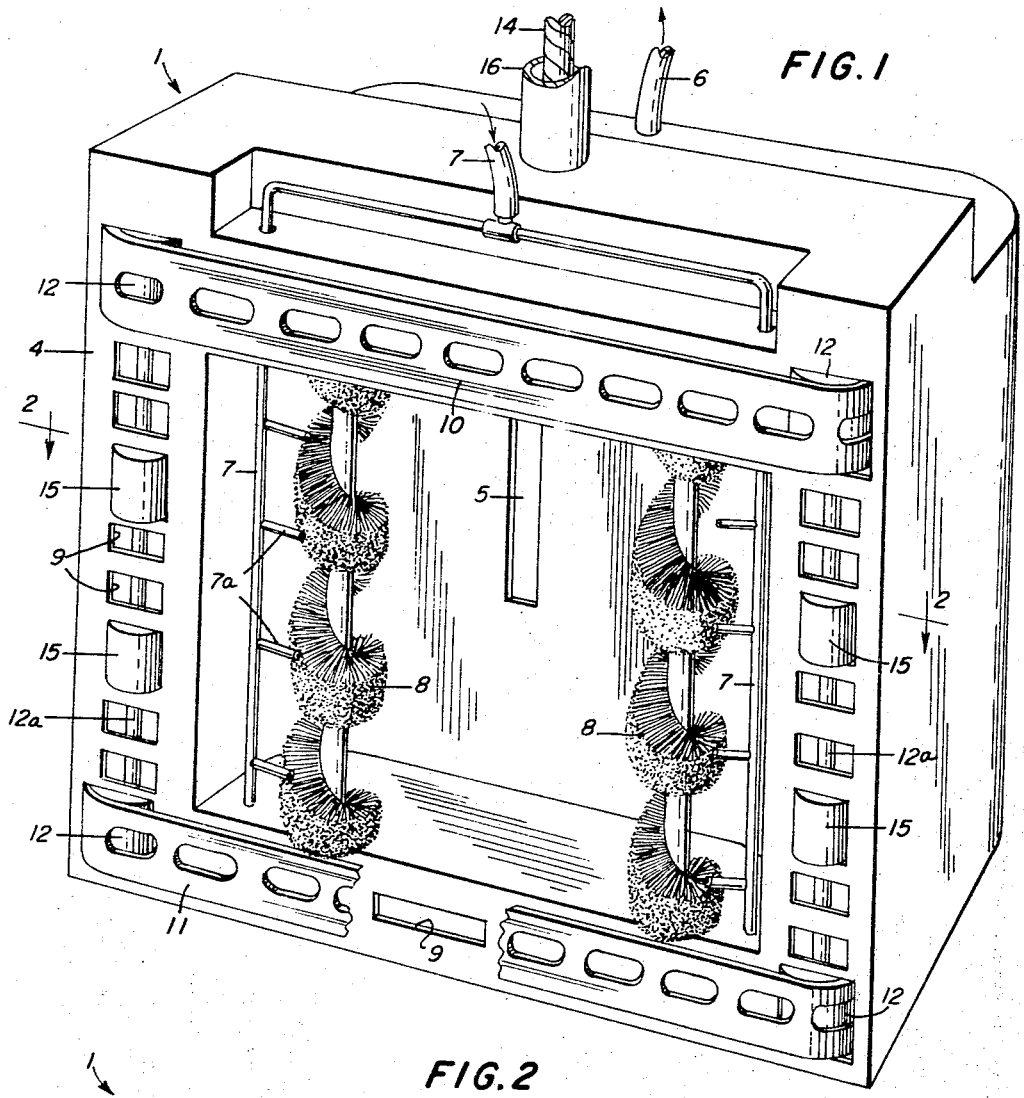
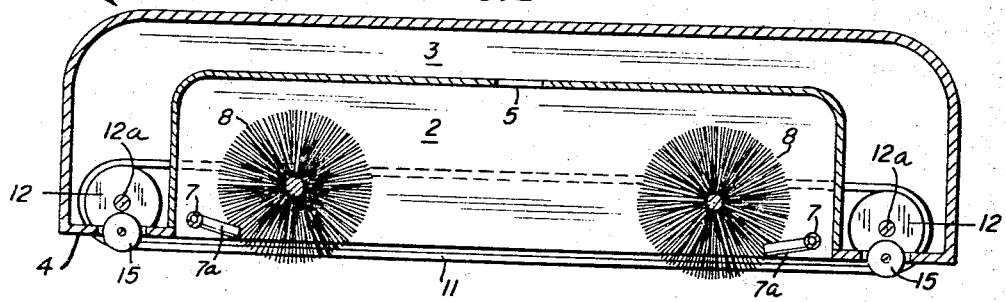
INVENTOR
WALTER L. WEST
BY *Ernest S. Cohen*
*M. Howard Silverstein*
ATTORNEYS

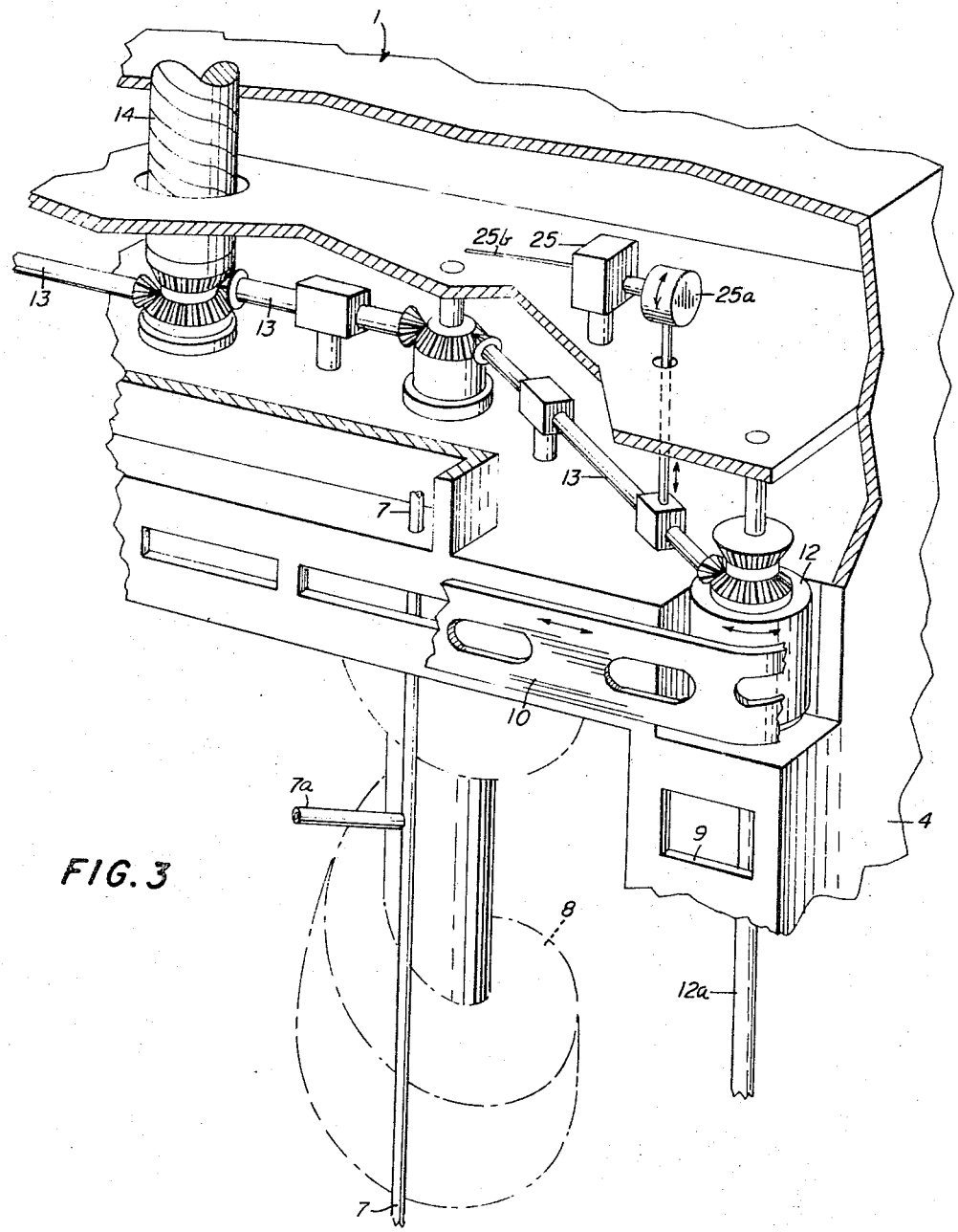

Aug. 29, 1967  W. L. WEST  3,337,889
MECHANICAL DEVICE FOR CLEANING THE
INTERIOR OF LARGE AQUARIUM TANKS
Filed March 11, 1966  4 Sheets-Sheet 4

INVENTOR
WALTER L. WEST

BY Ernest S. Cohen
M. Howard Silverstein
ATTORNEY

United States Patent Office 3,337,889
Patented Aug. 29, 1967

3,337,889
MECHANICAL DEVICE FOR CLEANING THE INTERIOR OF LARGE AQUARIUM TANKS
Walter L. West, Rockville, Md., assignor to the United States of America as represented by the Secretary of the Interior
Filed Mar. 11, 1966, Ser. No. 535,308
10 Claims. (Cl. 15—1.7)

ABSTRACT OF THE DISCLOSURE

Remotely controlled casing which moves along and cleans submerged interior surfaces of large aquarium tanks, involving detergent washing, brushing and suction action.

This invention relates to a device for cleaning the interior surfaces of large aquarium tanks.

Since the first aquarium tank was built many years ago, it has been a goal to construct an aquarium tank with an unhampered view of the specimens within. Work in this area has included employing the best obtainable glass partitions, sufficient background lighting, filtering systems, etc. A considerable degree of success in achieving viewing depth has been obtained, with one exception—a greenish brown-film (algae) sometimes forms on the glass.

At one time it was the practice to scour the algae from the glass with sand, which practice is prohibited today. Bristle brushes replaced the coarser abrasive, followed by the use of metal wools. To remove the growth on the window, the method of applying the required force has remained virtually unchanged for a century; it still is necessary to place a man in the tank to accomplish this task. This cleaning system has prevented the use of powerful algacides. Progressive window change, which reduces viewing clarity, results from the grating required by the presently employed cleaning systems.

The present invention provides a device for mechanically cleaning the inside of an aquarium tank without requiring a diver and without the use of excessive buffing.

For further objects and advantages of the invention reference is had to the following drawings in which FIG. 1 is a perspective view of the open side of the casing unit of the cleaning device.

FIG. 2 is a top sectional view along the line 2—2 in FIG. 1.

FIG. 3 is a cut-away view of part of FIG. 1.

Figure 4:
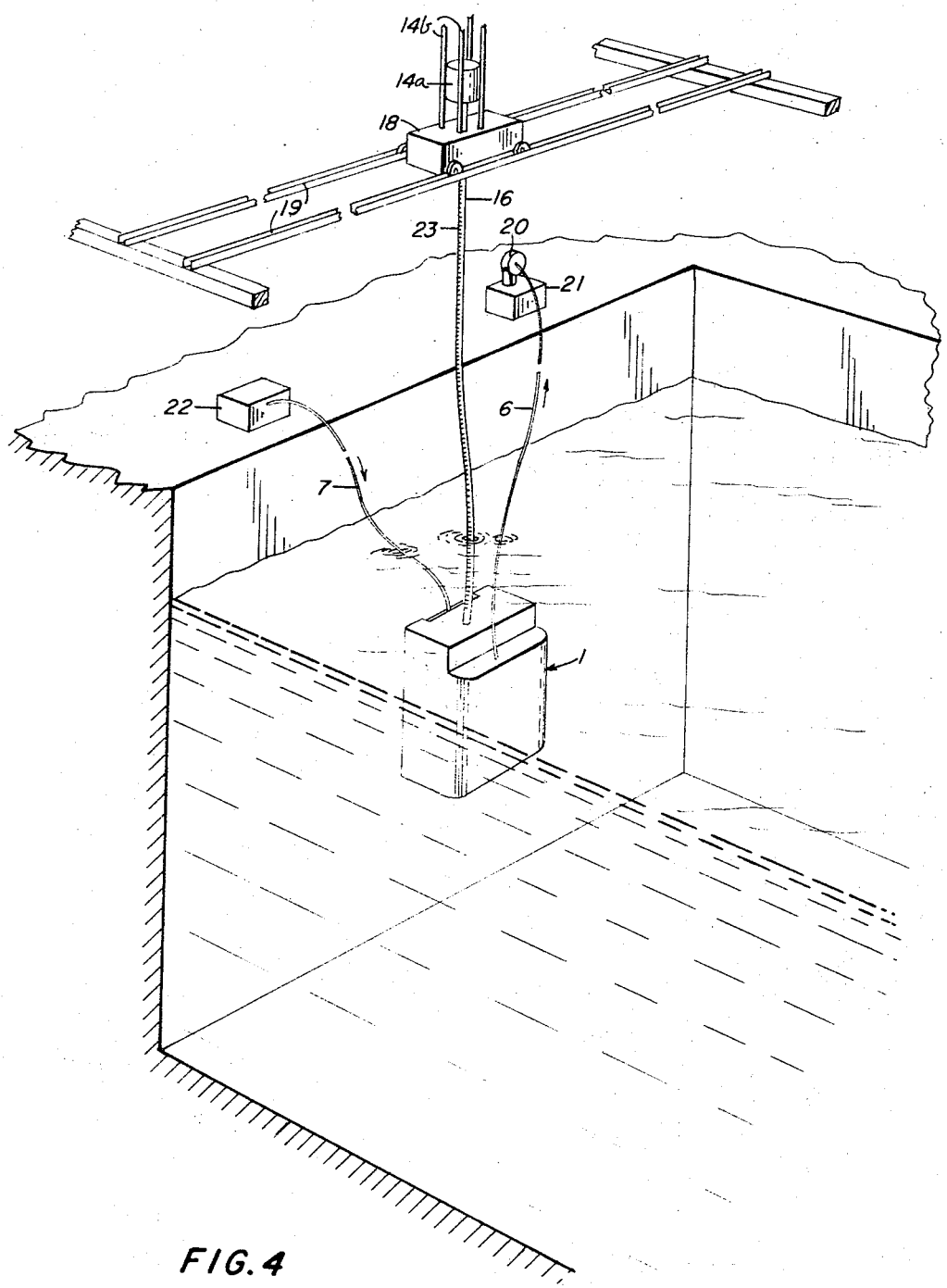
FIG. 4 is a perspective view of the entire cleaning device.

Broadly, the invention comprises a remotely controlled relatively small casing, which moves along the interior tank surfaces below the level of the water therein. Brushes and detergent within an opening in the casing come in direct contact with the tank surfaces as the casing opening is maintained directly opposite the tank surface during the moving action. A partial vacuum within the casing maintains the casing-surface contact.

Referring to FIGS. 1 and 2, numeral 1 designates the casing which comprises an open inner compartment 2 nested within and spaced from an outer compartment 3, the peripheral edge of the opening of the inner compartment being joined to outer compartment 3 by a continuous surface 4, the surface 4 being adapted to conform to and lie adjacent the interior tank surfaces. An orifice 5 in the inner compartment allows flow of fluids between compartments. By withdrawing fluid from compartment 3 through discharge tube 6 during operation of the device, a partial vacuum is established in compartment 3 and in compartment 2 (by way of orifice 5). As a result of the reduction in pressure in the inner compartment 2, the surrounding aquarium water forces the casing toward the interior tank surface, and toxic or nontoxic liquid cleaning solution such as detergent or soap is drawn through inlet tubes 7 into the inner compartment, to be directed by way of nozzles 7a toward the wall surface in the vicinity of brushes 8. Since a powerful cleaning solution can be employed, the brushes may be made of monofilament, nonabrasive materials, the continued use of which will not damage glass surfaces.

During manufacture, orifice 5 in compartment 2 is cut to a predetermined size depending upon the particular low pressure desired within the casing, or in other words, depending upon the desired degree of adhesion of the casing to the wall surface. For example, strong forces are necessary to maintain contact between the casing and wall surface in an aquarium for dolphins wherein the powerful fish may butt the casing. Obviously, the capacity of the pump connected to discharge outlet 6 must also be considered when determining the desired pressure within the casing. A sudden break in the partial vacuum in the open inner compartment 2 caused by, for example, the casing being butted off the wall surface, will stop the inflow of cleaning solution since the cleaning solution flows into the casing only as a result of the partial vacuum.

Referring to FIGS. 1–3, orifices 9 along the length of continuous surface 4 lead to compartment 3 to prevent cleaning solution from leaking out of the casing recess into the surrounding aquarium water and, at the same time, to substantially prevent aquarium water from passing into the inner compartment 2, thereby effecting a liquid seal between the casing and aquarium water.

As shown in FIGS. 1–3, parallel crawler belts 10 and 11 overlies some of the orifices 9 in the continuous surface 4 around the opening in inner compartment 2. The belts are perforated to allow fluids to flow therethrough and then through underlying orifices 9 into outer compartment 3. Crawler belts 10 and 11 are driven through, for example, belt drive wheels 12, tie shafts 12a and bevel gear means 13 by flexible drive shaft 14 connected to a remotely located motor to enable the casing to move across the interior surface of the aquarium. Brushes 8 are also rotated by flexible drive shaft 14 and part of bevel gear means 13. The gears and shafts are suitably journalled within the casing as will be apparent to those skilled in the art. Freely rotating rollers 15 protruding from the side of the casing and in axially parallel alignment with the crawler belt shafts 12a allow the casing to easily move across the wall surface.

In operation, as shown in FIG. 4, the casing 1 is lowered by way of flexible conduit 16 (surrounding flexible drive shaft 14) into the aquarium pool 17 from a motor-carrying trolley 18 mounted for movement on a guide rail 19 out of the public view. A pump 20 located external to the reservoir withdraws liquid slurry from discharge tube 6, and conveys the slurry to a suitable receiver 21. Cleaning solution is then drawn from solution reservoir 22 through inlet tube 7 into the casing open inner compartment 2 as a result of the partial vacuum within the compartment. Although these components are shown elsewhere, pump 20, slurry receiver 21 and solution reservoir 22 can be located on the trolley. Guide rail 19 may be placed above a false ceiling, welded or otherwise connected to the main ceiling or supporting I-beams, in which case the false ceiling would have a slot below the rail to allow the flexible drive shaft conduit and other tubes to extend therethrough. So that the movement of the casing 1 along the interior surface of the aquarium may be carefully controlled, the guide rail should be substantially parallel to the surface to be cleaned. Therefore, a plurality of guide rails with accompanying trolleys and cleaner casings are required to clean the multi-sided aquarium tanks.

Figure 5:
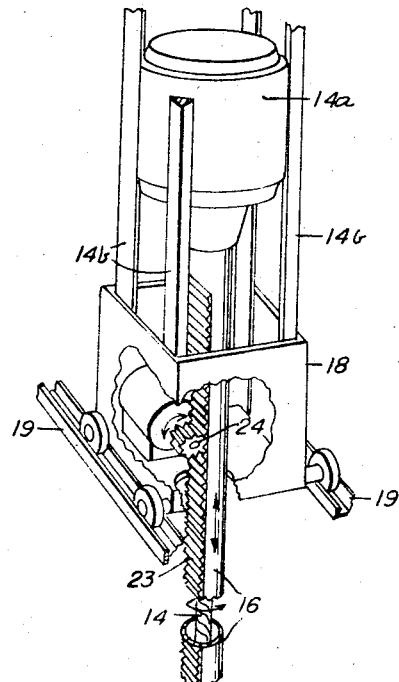
FIG. 5 is a close-up view of the raising and lowering device for the casing.

A conventional device such as a rack 23 (FIGS. 4 and 5) along the length of flexible conduit 16 and a pinion gear 24 driven by a motor on trolley 18 enables the flexible conduit 16 (which contains the flexible drive shaft 14 therein and the small drive shaft motor 14a at the upper end thereof) to be raised or lowered, thereby raising or lowering the casing in the aquarium tank. Since the flexible conduit 16, flexible drive shaft 14 and drive shaft motor 14a will extend several feet above the trolley along the guides 14b during a raising operation, it is necessary that there be a substantial clearance above the trolley to accommodate these components. If no clearance is available, the shafts and motor may be wound upon a cylinder. Conduit 16 could be constructed of telescopic sections to reduce the number of components that extend above the trolley during a raising operation.

Figure 6:
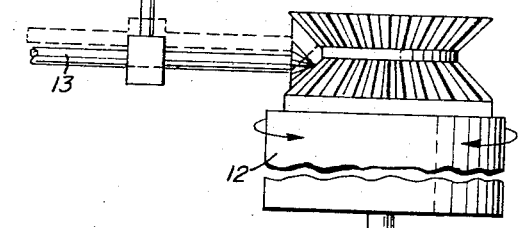
FIG. 6 is a close-up view of the reverse-drive mechanism for the casing unit as shown in FIG. 3.

By synchronizing the speed of the trolley and the crawler belts, the casing is assured movement in a horizontal path. At the end of each horizontal path, the driving mechanism is stopped and the casing is raised or lowered, as the case may be, to the next level. Then the direction of the trolley is reversed by a device such as an electric clutch, while actuation of a solenoid 25 (FIGS. 3 and 6) connected to a cam means 25a changes the position of that part of the bevel gear means 13 which moves each of the crawler belt drive wheels 12, thereby reversing the movement of the belt. A wire 25(b) to the solenoid can be run from the trolley through the flexible conduit 16 or from any other convenient spot. Other conventional reversing mechanisms could also be employed. An operator can electrically control the operation of the entire cleaning device from a position remote from the trolley, or an automatic control system could be used.

Figure 7:
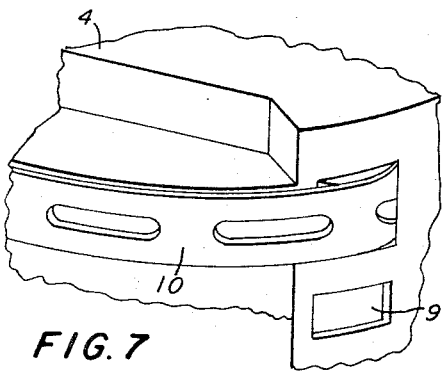
FIG. 7 is a partial perspective view of the open side of a modified version of the casing unit.
Figure 8:
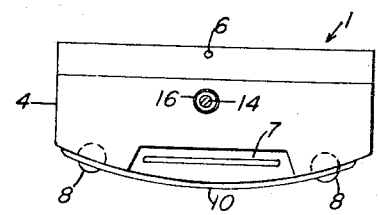
FIG. 8 is the top view of the modified casing shown in FIG. 7.

Many structural variations are possible with the cleaning device of the present invention. For example, in order to mount a casing flush against a curved wall surface, the continuous surface 4 of the casing which joins the inner compartment 2 to the outer compartment 3 would have to be shaped as shown in perspective in FIG. 7 (top view, FIG. 8). Also, some aquariums are designed with narrow, flat corner windows, in which case it would be necessary to control the operation so that the casing crawls vertically rather than horizontally. Further, stiff bristle brushes may be employed in the casing in place of the soft brushes when the device is only used to clean concrete aquarium surfaces. Still further, the driving motor for the crawler belts could be attached directly to the casing thereby avoiding the use of the guide rail and trolley. Under this latter arrangement, the belts may be individually controlled for turning motion, and raising and lowering of the casing may be accomplished by the projection of recessed wheels on the casing which move the casing along the wall surface in a direction perpendicular to the casing movement produced by the belts. A simple electro-mechanical step memory system could be used to automatically control this compact device. Instead of the crawler belts, other power driven moving means such as a plurality of closely adjacent driven rollers, which may have elastic surfaces, may be employed.

As compared to a crew divers, the cleaning device of the present invention is capable of more efficiently cleaning large expanses of interior acquarium walls without progressively reducing viewing clarity through the glass walls. Use of the device eliminates the divers and driving gear, and instead incorporates rapid chemical-mechanical procedures.

Other tank structures and surfaces below the surface of a liquid contaminated by algae, other growths, or by dirt, such as swimming pools, water tanks, oil tanks, etc., could also be cleaned by the device.

While the particular cleaning device described herein is well adapted to carry out the objects of the present invention, it is to be understood that various modifications and changes may be made all coming within the scope of the following claims.

What is claimed is:
1. A device for cleaning the interior surfaces of a tank comprising
   (a) a casing;
   (b) said casing comprising an outer compartment and an open inner compartment nesting within and spaced from said outer compartment;
   (c) said inner compartment having a first orifice to allow fluid flow between the inner and outer compartments;
   (d) the peripheral edge of the opening of said inner compartment being joined to said outer compartment to form a continuous surface around the opening of said inner compartment, said surface being adapted to conform to and lie adjacent the interior surfaces of said tank;
   (e) a plurality of second orifices on said continuous surface, spaced along substantially the entire length thereof, to allow fluid flow into the outer compartment;
   (f) power-driven moving means mounted on said continuous surface to enable the casing to move along the interior tank surfaces;
   (g) means connected to said casing to drive said moving means;
   (h) tube means connected to the casing to convey cleaning solution into the inner compartment so that said solution will contact the interior tank surfaces opposite the inner compartment opening during operation of the device;
   (i) means connected to the casing to evacuate both compartments and create a partial vacuum therein, which partial vacuum enables the casing to adhere to the wall surface during operation of the device and causes cleaning solution to be drawn into the inner compartment through the said cleaning solution conveying tube means.

2. The device of claim 1 further including rotatable brush means within said inner compartment to scrub the interior tank surface during operation, and means connected to the casing to rotate the brush means, and wherein said means to inject cleaning solution into said inner compartment comprises a plurality of nozzles positioned to inject solution toward the tank surface in the area of the brushes.

3. The device of claim 1 further including means to raise and lower said casing in said tank.

4. The device of claim 3 wherein said means to raise and lower said casing comprises
   (a) a motor-driven trolley on a trolley guide means external to said tank;
   (b) a flexible conduit connecting the casing to the trolley;
   (c) motor means on the trolley connected to the flexible conduit, capable to raising and lowering the conduit;
   and wherein said moving drive means comprises a motor means on said trolley, and a flexible drive shaft connecting said motor means to said power driven moving means.

5. The device of claim 1 wherein said power driven moving means comprises crawler belt means.

6. The device of claim 5 wherein freely rotating rollers protrude from that part of the said continuous surface not covered by said belt means, to contact the interior tank surface during operation of the device and provide ease of movement of the casing along the surface, and further including means to raise and lower said casing in said tank.

7. The device of claim 6 wherein some of said plurality of second orifices on said continuous surface are arranged so that first and second opposing portions of said continuous surface each possess a substantially straight row of said orifices, the two rows being substantially parallel to one another, and wherein said continuous crawler belt means comprises two substantially parallel continuous crawler belts, part of one continuous belt overlying one of the said rows of orifices, part of the other continuous belt overlying the other of said rows, and wherein each belt possesses perforations throughout the continuous length thereof whereby some of said perforations overlie said parallel rows of orifices in the continuous surface during operation of the device so that liquid may pass through said overlying perforations and then through said underlying orifices into the outer compartment.

8. The device of claim 7 further including rotatable brush means within said inner compartment to scrub the interior tank surface during operation, and means connected to the casing to rotate the brush means, and wherein said means to inject cleaning solution into said inner compartment comprises a plurality of nozzles positioned to inject solution toward the tank surface in the area of the brushes.

9. The device of claim 8 wherein said means to raise and lower said casing comprises
(a) a motor-driven trolley on a trolley guide means external to said tank;
(b) a flexible conduit connecting the casing to the trolley;
(c) motor means on the trolley connected to the flexible conduit, capable of raising and lowering the conduit; and wherein said crawler belt drive means comprises a crawler belt motor means on said trolley and a flexible drive shaft connecting said crawler belt means to said crawler belt motor means.

10. The device of claim 9 wherein the path of the trolley along the guide means is substantially parallel to the interior tank surface being cleaned by the attached casing.

References Cited
UNITED STATES PATENTS

| | | | |
|---|---|---|---|
| 2,646,889 | 7/1953 | Dulak | 15—1.7 |
| 3,226,259 | 12/1965 | Armbrust | 15—7 X |
| 3,254,355 | 6/1966 | Shaw | 15—1.7 |

CHARLES A. WILLMUTH, *Primary Examiner.*

E. L. ROBERTS, *Assistant Examiner.*